J. H. Guild,

Water Cut-Off.

No. 3,212. Reissued Nov. 24, 1868.

Witnesses:
Thos Tusche
Wm. Turner

Inventor
J. H. Guild
Per Munn & Co
Attorneys

N. PETERS, PHOTO-LITHOGRAPHER, WASHINGTON, D. C.

UNITED STATES PATENT OFFICE.

J. H. GUILD, OF RUPERT, VERMONT.

IMPROVEMENT IN FLOAT-VALVES.

Specification forming part of Letters Patent No. 64,663, dated May 14, 1867; Reissue No. 3,212, dated November 24, 1868.

*To all whom it may concern:*

Be it known that I, J. H. GUILD, of Rupert, in the county of Bennington and State of Vermont, have invented a new and Improved Device for Regulating the Flow of Liquids, of which the following is a full, clear, and exact description, reference being had to the accompanying drawing, forming part of this specification, and in which—

Figure 1:
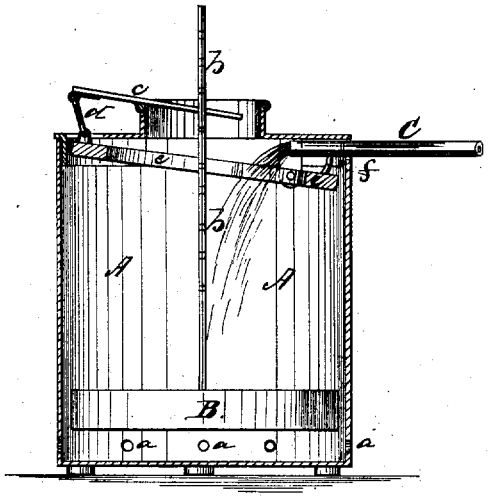
Figure 2:
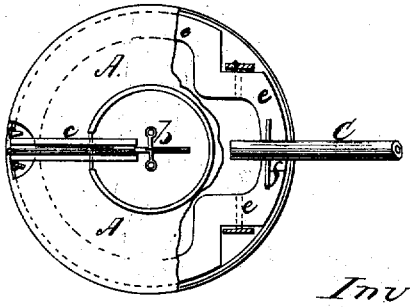

Figure 1 represents a sectional elevation of an apparatus having my improvement applied to it, and Fig. 2 is a partly sectional plan of the same.

Similar letters of reference indicate corresponding parts.

This invention relates to a device whereby the flow of liquids into vessels of different descriptions may be regulated, so that the liquid will not rise therein above a certain or fixed level. By this my improvement the valves for controlling flow that have been previously employed in various kinds of apparatus, and which are so liable to get out of order, are dispensed with, and in place thereof a valvular action given to the conduit or tube through which the flow is established, by making said tube flexible, and combining with the same a clamp, connected, to secure an automatic action, with a float that, as it rises and falls, serves, by external gripe or compression of or on said tube, to regulate the flow. Thus, as soon as the liquid admitted by said tube rises in the vessel or receiver to a certain level, it so lifts the float, which is connected with a system of levers, as to cause the flexible tube to be clamped or compressed, and flow to be shut off. On the other hand, as soon as the liquid in the receiver diminishes, the float is lowered and the tube opened again.

One great advantage of this valvular device is that it is exempt from getting out of order. When, however, by wear or otherwise, that part of the tube where it has been exposed to the clamping or compressing action becomes torn or injured, such portion can be cut off and the tube be moved forward to expose a fresh portion to such valvular action; or the tube, if totally destroyed, can be easily renewed.

This invention is particularly applicable to the feeding of sap to the evaporating-pan, as in the production of maple-sugar, and will here be described in such connection, though it may be used with equal advantage for other purposes.

Referring to the accompanying drawing, A represents a cylindrical or other upright vessel, which is placed in the evaporating-pan or other outside structure. A float, B, made of any suitable material, is arranged in the vessel A. The sap or liquid is admitted to the vessel A from any suitable receptacle, through an india-rubber or other flexible tube, C, the delivery end of which passes through a hole provided in the side of the vessel A, as shown.

At or near the bottom of the vessel A are perforations *a*, for the purpose of establishing communication for free flow of the liquid between the vessel A and pan or outer structure in which said vessel is placed. To the float B is secured a vertical rod, *b*, which is perforated, or otherwise so constructed as that it may be secured in a detachable and adjustable manner to a lever, *c*, which connects by a link, *d*, with a clamping-lever, *e*, as shown, said lever being provided with, say, a projection, *f*, directly under the tube C, as represented in the drawing, in order that, as the float is raised, the lever *c* will depress the longer arm of the lever *e*, and cause the projection *f* on the opposite arm of said lever to be raised or pressed against the tube C, and so clamp or compress said tube against a fixed or other surface, as, for instance, against the cover of the vessel A, and thereby prevent any further flow of liquid through said tube. As soon as the float is lowered, the tube C will again be opened.

By connection of the clamp or clamping-lever with the float, the valvular action of the tube is made automatic.

Where the clamp is constructed as shown and described—as, for instance, by a lever, *e*, hung on an intermediate pivot or fulcrum, and with its longer and weightier arm disposed, as represented—then, on disconnecting the float from gear with said lever, whether through an intermediate lever or otherwise, the weightier arm of the lever *e* drops and effects closure of the tube, so that the vessel A may be removed from the pan in which it is placed, with the flow through the tube C automatically stopped as required.

To secure a proper working of the float, or steady and timely valvular action of the tube in cases where the float rests on or is immersed in hot or boiling liquids, as in sap-evaporators, the float, instead of being applied direct to the liquid in the pan or boiler, is arranged, as described, in a separate vessel, A, situated within said pan and communicating with the latter by perforations *a*, which serve to break the ebullition and give a steadiness to the liquid acting on the float, for which purpose, also, the vessel A is furnished with feet or legs that lift its bottom from contact with the bottom of the outer pan under which the fire plays, and where there is, of consequence, more or less of agitation.

What is here claimed, and desired to be secured by Letters Patent, is—

1. The arrangement of the fulcrum of the clamping-lever *e* in such manner as that, on disconnecting the float from gear with said lever, the latter drops to effect closure of the tube, substantially as shown and described.

2. The arrangement, in the perforated vessel A, of the float B, having the perforated or notched vertical rod *b*, engaging with the pivoted oscillating lever *c*, connected by the link *d* to the lever *e*, pivoted to the opposite side of the vessel in such a manner that, as the float B is elevated by the water, the projection *f* upon said lever *e* presses against the elastic pipe C, effectually closing the same, substantially as described, and for the purpose specified.

J. H. GUILD.

Witnesses:
A. LeClerc,
A. Kinnier.